(12) United States Patent
Takeo et al.

(10) Patent No.: US 7,602,678 B2
(45) Date of Patent: Oct. 13, 2009

(54) LENS HOLDER AND LENS PROTECTOR FOR USE IN OPTICAL PICK-UP AND METHOD OF MANUFACTURING SAME

(75) Inventors: Katsushi Takeo, Mie (JP); Keiichi Goto, Mie (JP); Satoru Fukuzawa, Mie (JP)

(73) Assignee: NTN Corporation, Osaka (JP)

( * ) Notice: Subject to any disclaimer, the term of this patent is extended or adjusted under 35 U.S.C. 154(b) by 739 days.

(21) Appl. No.: 10/945,295

(22) Filed: Sep. 20, 2004

(65) Prior Publication Data

US 2005/0073755 A1    Apr. 7, 2005

(30) Foreign Application Priority Data

Oct. 1, 2003    (JP) ................ P2003-342720

(51) Int. Cl.
  *G11B 7/09* (2006.01)
  *B29C 45/38* (2006.01)
  *B29C 45/26* (2006.01)

(52) U.S. Cl. .............. 369/44.15; 720/671; 359/819; 264/1.1; 425/808

(58) Field of Classification Search ......... 359/811–813, 359/819, 822–823, 827, 830; 264/279, 1.1, 264/1.32; 369/44.15, 44.22, 44.23; 425/808; 720/671

See application file for complete search history.

(56) References Cited

U.S. PATENT DOCUMENTS

| | | | | |
|---|---|---|---|---|
| 5,975,882 | A * | 11/1999 | Nomura et al. ............... | 451/42 |
| 6,008,957 | A * | 12/1999 | Nomura et al. ............. | 359/819 |
| 6,115,197 | A * | 9/2000 | Funahashi .................. | 359/826 |
| 6,144,500 | A * | 11/2000 | Iwaki et al. ................. | 359/719 |
| 6,219,191 | B1 * | 4/2001 | Iwaki et al. ................. | 359/811 |
| 6,707,619 | B1 * | 3/2004 | Okuno ........................ | 359/694 |
| 6,781,946 | B2 | 8/2004 | Murata et al. | |
| 7,012,768 | B2 * | 3/2006 | Hirose et al. ................ | 359/822 |
| 7,099,090 | B2 * | 8/2006 | Daikoku ..................... | 359/719 |
| 2002/0060974 | A1 * | 5/2002 | Murata et al. .......... | 369/112.23 |
| 2002/0135893 | A1 * | 9/2002 | Hirose et al. ................ | 359/819 |

FOREIGN PATENT DOCUMENTS

GB    2244345 A  * 11/1991

(Continued)

OTHER PUBLICATIONS

English-machine translation of JP 11-221842 A to Ishimura et al., published on Aug. 17, 1999.*

*Primary Examiner*—William J Klimowicz
(74) *Attorney, Agent, or Firm*—James V. Costigan; Hedman & Costigan, P.C.

(57) ABSTRACT

The present invention provides a lens holder and a lens protector having little burrs and no gate marks formed an a surface thereof confronting an optical disc and a method of manufacturing the lens holder and the lens protector. The lens holder is formed in integration with a boss by injection-molding and has a hole capable of holding an objective lens on a surface of the lens holder confronting an optical disc. The boss having a gate and a contact portion which contacts a ejector pin is formed on a peripheral side surface of the lens holder when the injection molding is performed and cut off from the lens holder after the injection molding finishes.

2 Claims, 5 Drawing Sheets

FOREIGN PATENT DOCUMENTS

| | | | | |
|---|---|---|---|---|
| JP | 60063743 A | * | 4/1985 |
| JP | 06027360 A | * | 2/1994 |
| JP | 07057424 A | * | 3/1995 |
| JP | 10090579 A | * | 4/1998 |
| JP | 10246801 A | * | 9/1998 |
| JP | 11221842 A | * | 8/1999 |
| JP | 2000266980 A | * | 9/2000 |
| JP | 2001021783 A | * | 1/2001 |
| JP | 2002148501 A | * | 5/2002 |
| JP | 2003-222535 | | 8/2004 |

* cited by examiner (a)

(b)

(c)

(a)

(b)

(c)

(a)

(b)

PRIOR ART

LENS HOLDER AND LENS PROTECTOR FOR USE IN OPTICAL PICK-UP AND METHOD OF MANUFACTURING SAME

BACKGROUND OF THE INVENTION

The present invention relates to a lens holder and a lens protector for use in an optical pick-up.

As optical information-recording media, a CD-ROM, a CD-R, a CD-RW, a DVD-ROM, and a DVD-RW are known. The optical pick-up of these apparatuses for performing a focus control and a tracking control detects information by converging light beams which have passed through an objective lens on a disc surface. Thus to form an image on the disc surface, it is necessary to focus the light beams thereon by compensating defocusing caused by deflection of the disc. If there is a deviation (radial deviation of optical axis) between a signal track (bit string of information) on the disc and the optical axis of the objective lens, information cannot be correctly read. Thus it is necessary to make the optical axis of the objective lens coincident with the signal track by compensating the deviation of the signal track.

Because the capacity and density of an optical disc has increased greatly in recent years, a work space has become small. That is, the clearance between the objective lens and the disc surface has become short when a focus servo is in operation. Consequently the danger of a collision between the objective lens and the optical disc has increased. Owing to a much increase in the capacity and density of the optical disc, a protection layer covering the signal-recording layer of the optical disc has become thinner. Therefore the conventional optical pick-up has a problem that owing to the collision between the objective lens and the optical disc, the signal-recording layer of the optical disc is liable to be damaged.

To solve the problems, attempts have been made as disclosed in Japanese Patent Application Laid-Open No. 2002-222535. In the disclosure, a coating layer made of fluoro resin is formed on the surface, of the lens holder holding the objective lens, which confronts the optical disc. Thereby when the focus servo is not in operation, the optical disc collides with the coating layer before the optical disc collides with the objective lens. Thereby it is possible to prevent the objective lens from colliding with the optical disc and the optical disc from being damaged.

The lens holder holding the objective lens is made of injection-molded synthetic resin. A product formed by injection-molding the synthetic resin has burrs formed on a parting line thereof, a contact portion thereof which contacts a ejector pin, and a gate thereof. The burrs formed on the product are rubbed off. Powder generated from the burrs are scattered in the apparatus such as the CD-ROM, thus damaging the optical disc or causing a failure.

Heretofore barrel polishing is used to remove the burr from the lens holder. However, the barrel polishing has a problem that an objective lens-mounting hole and a bearing hole are liable to be clogged with media.

When the lens holder is formed by injection molding, it has an unfavorable surface configuration on the periphery of the gate. That is, the lens holder has a large flatness. It is unpreferable to set the gate on the lens holder at a position of the surface confronting the optical disc. It is unpreferable to set the gate on the surface, of the lens holder, on which a coating layer is formed. When the gate is formed on the rear surface of the lens holder, the mark of the ejector pin remains on the surface of the lens holder over which the coating layer is formed.

SUMMARY OF THE INVENTION

It is an object of the present invention to provide a lens holder and a lens protector having little burrs and no gate marks formed on a surface thereof confronting an optical disc and a method of manufacturing the lens holder and the lens protector.

The lens holder of the present invention for use in an optical pick-up is formed in integration with a boss by injection-molding and has a lens-mounting hole capable of holding an objective lens on a surface of the lens holder confronting an optical disc. The boss having a gate and a contact portion which contacts a ejector pin is formed on a peripheral side surface of the lens holder when the injection molding is performed and cut off from the lens holder after the injection molding finishes.

The lens protector of the present invention for use in an optical pick-up is formed in integration with a boss by injection-molding. The lens protector is mounted on a surface of a lens holder confronting an optical disc, with the lens protector surrounding a periphery of an objective lens.

The boss having a gate and a contact portion which contacts a ejector pin is formed on a peripheral side surface of the lens protector when the injection molding is performed and cut off from the lens protector after the injection molding finishes.

The boss is formed at three positions spaced at equal intervals on the peripheral side surface.

A coating layer is formed on the surface confronting the optical disc.

Since the contact portion which contacts the ejector pin is not formed on the lens holder nor on the lens protector, less burrs are formed on the surface thereof. The gate mark is not formed on the surface of the lens holder and the lens protector confronting the optical disc. Therefore no burrs are formed on the surface of the lens holder and the lens protector confronting the optical disc. Thus excellent flatness (JIS B 0182) can be kept thereon. Consequently even though the lens holder and the lens protector contact the optical disc, the surface of the optical disc is not damaged. And, the surface of the lens holder and the lens protector can be coated easily with a film.

There is provided a method of manufacturing a lens holder or a lens protector of an optical pick-up by using an injection-molding die having a stationary-side template and a movable-side template which is butted against the stationary-side template to form a cavity including a boss portion. The method has the steps of injecting a resin material to be molded into the cavity from a gate communicating with the boss portion; projecting a molded product from the cavity by means of a ejector pin in contact with the boss after injection molding finishes; and cutting off the boss from the molded product including the boss.

In the process of projecting the molded product from the cavity, the lens holder and the boss can be reliably projected from the cavity by means of the ejector pin in a favorable balance. In addition the flow distribution of melted resin is uniform when the melted resin is filled into the cavity. Thereby the lens-mounting hole has high dimensional accuracy.

DETAILED DESCRIPTION OF THE PREFERRED EMBODIMENTS

Figure 1:
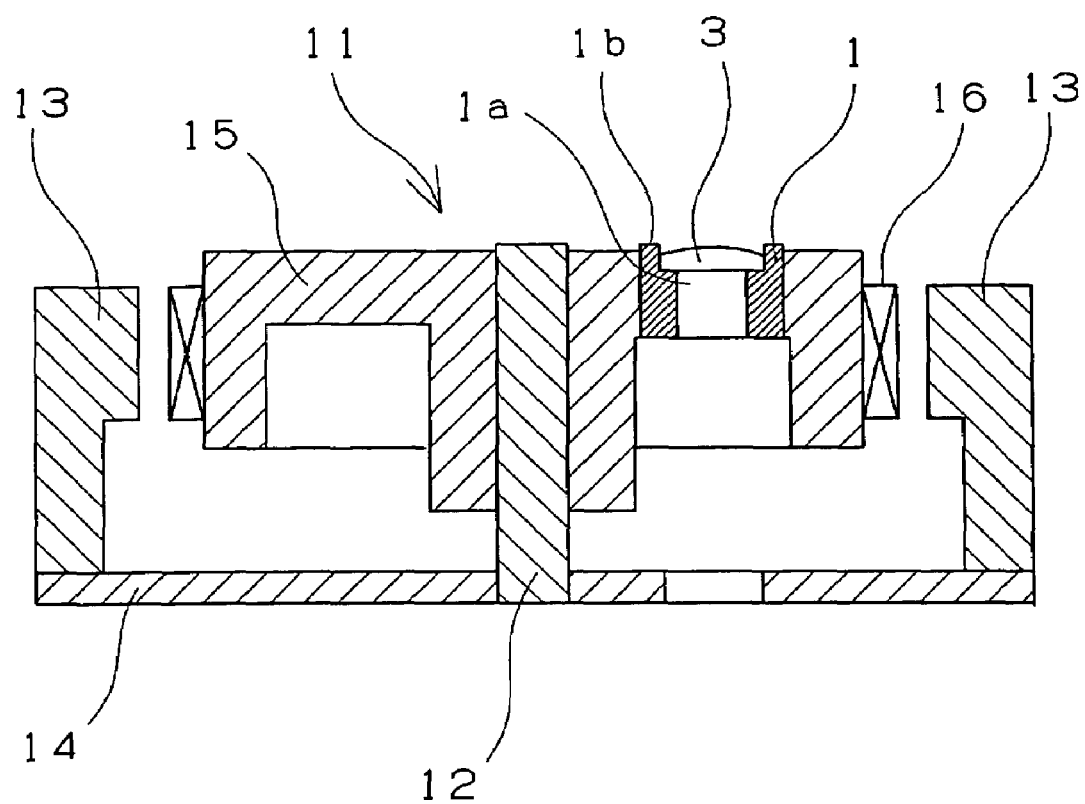
FIG. 1 is a sectional view of an optical pick-up having a lens holder of the present invention.

An example of an optical pick-up having a lens holder of the present invention is described below with reference to FIG. 1. FIG. 1 is a sectional view of an optical pick-up of a driving part-supporting system using a supporting shaft.

A driving part of an optical pick-up 11 moves in a focusing direction under the guide of a stationary supporting shaft 12 to perform a focusing control, while the driving part is rotating on the supporting shaft 12 to perform a tracking control. The supporting shaft 12 and a magnetic core 13 disposed on the periphery thereof are fixed to a base 14. A lens holder support 15 is rotatably fitted on the supporting shaft 12. A driving coil 16 is provided on a peripheral surface of the lens holder support 15. A lens holder 1 holding an objective lens 3 at a lens-mounting hole 1a thereof is mounted on the lens holder support 15 at an eccentric position thereof. The driving coil 16 includes a focusing coil wound around the shaft of the lens holder support 15 and tracking coils (not shown) coils wound around shafts orthogonal to the shaft of the lens holder support 15. The tracking coils are disposed symmetrically with respect to a plane including the shaft of the lens holder support 15. The axial movement amount of the lens holder support 15 and its rotation amount are controlled according to a magnitude of electric current flowing through the focus coil and the tracking coil.

As described above, because the capacity and density of the optical disc has increased in recent years, the interval between the objective lens 3 and the disc surface has become short. Therefore in the optical pick-up 1 shown in FIG. 1, the surface of the optical disc may contact a surface 1b, of the lens holder 1 holding the objective lens 3, which confronts the optical disc. The lens holder of the present invention has been developed to prevent a signal-recording layer of the optical disc from being damaged in such a case.

Figure 2:
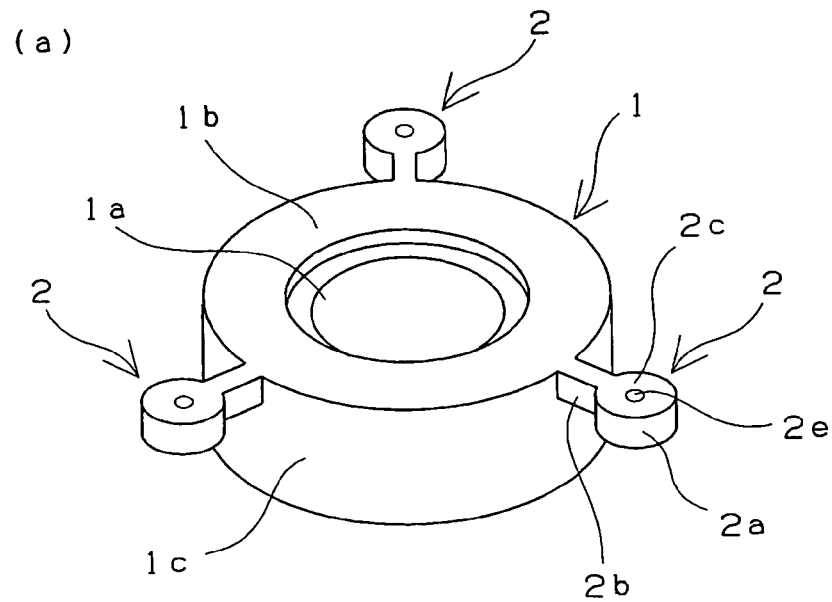
FIGS. 2(a)-(c) are perspective views of a lens holder according to one embodiment of the present invention.
Figure 2:
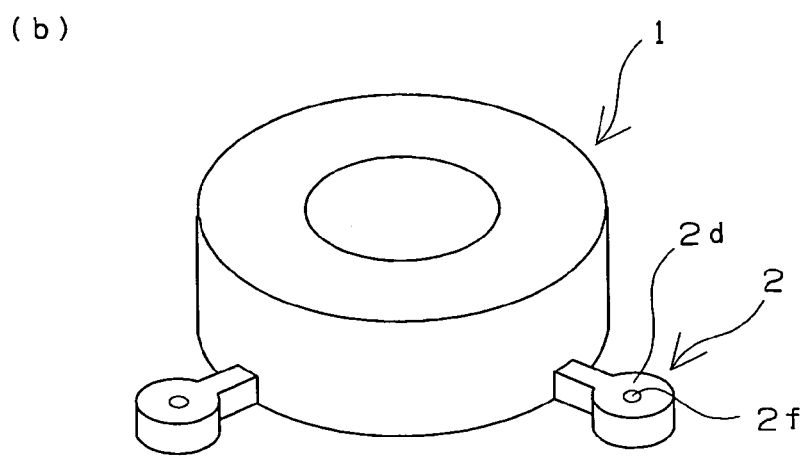
Figure 2:
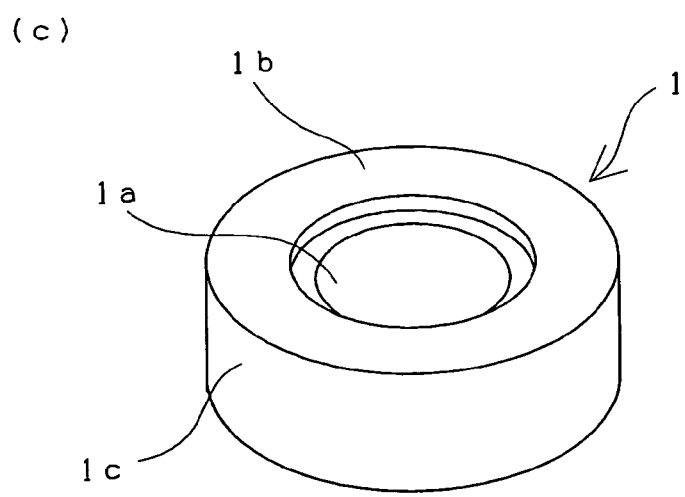

The lens holder of the present invention for use in the optical pick-up is described below with reference to FIG. 2. FIG. 2A is a perspective view of the lens holder, with a surface thereof confronting the optical disc facing upward, before a boss is cut off from the lens holder. FIG. 2B is a perspective view of the lens holder, with the surface thereof confronting the optical disc facing downward, before the boss is cut off from the lens holder. FIG. 2C is a perspective view of the lens holder from which the boss shown in FIG. 2A has been cut off.

The lens holder 1 has the lens-mounting hole 1a for holding the objective lens at its center. The lens holder 1 has any configurations, provided that it can be mounted on the lens holder support shown in FIG. 1. For example, the lens holder 1 is cylindrical as shown in FIG. 2C. The lens-mounting hole 1a is so constructed as to have one diameter when the lens holder 1 has one objective lens and or be stepped, namely, have two diameters when the lens holder 1 has front and rear objective lens having different diameters.

As shown in FIG. 2A, a plurality of bosses 2 is formed on the lens holder 1 in an injection-molding process. The bosses 2 are disposed on a peripheral side surface 1c of the lens holder 1. Each of the bosses 2 has a gate mark 2e formed on a surface 2c thereof confronting the optical disc and a contact portion 2f, contacting an ejector pin, which is formed on a rear surface 2d thereof, as shown in FIG. 2B. After the injection-molding process finishes, the bosses 2 are cut off from the lens holder 1. Thereby the lens holder 1 does not have the gate mark 2e or the contact portion 2f that contacts the ejector pin on the surface 1b thereof confronting the optical disc. Consequently no burrs are formed on the surface 1b of the lens holder 1. Therefore when the lens holder 1 contacts the optical disc, the surface of the optical disc is not damaged.

The number of the bosses 2 is so selected that melted resin can be filled into a cavity from the gate and that the lens holder 1 and the boss 2 can be reliably projected from the cavity by means of the ejector pin. As shown in FIG. 2A, it is preferable to form three bosses 2 on the lens holder 1. It is also preferable that the bosses 2 are spaced at equal intervals along the peripheral side surface 1c of the lens holder 1. By forming the boss 2 on the peripheral side surface 1c of the lens holder 1 at three positions spaced at equal intervals, the lens holder 1 and the boss 2 can be reliably projected from the cavity by means of the ejector pin in a favorable balance. In addition the flow distribution of the melted resin is uniform when it is filled into the cavity. Thereby the lens-mounting hole 1a has high dimensional accuracy.

It is preferable to reduce the sectional area of the contact portion of the boss 2 that contacts the peripheral side surface 1c of the lens holder 1, provided that the boss 2 has a mechanical strength to such an extent that it is not broken when the boss 2 is projected from the cavity by means of the ejector pin. Thereby it is easy to cut off the boss 2 after the injection-molding operation finishes and prevent burrs from being formed on the peripheral side surface 1c of the lens holder 1 after the boss 2 is cut off. As shown in FIG. 2A, the boss 2 is constructed of a body 2a having the gate mark 2e and the contact portion 2f which contacts the ejector pin; and a connection portion 2b connecting the body 2a and the lens holder 1 to each other. The width of the connection portion 2b in the diametrical direction of the body 2a is set smaller than the diameter of the body 2a. The connection portion 2b may be tapered off in such a way that the sectional area of the contact portion thereof at the side of the peripheral side surface 1c of the lens holder 1 is smaller than the sectional area of the contact portion thereof at the side of the body 2a of the boss 2.

It is preferable to form a coating layer on the surface 1b of the lens holder 1 confronting the optical disc. The coating layer may be made of known resin, for example, such as fluoro resin and urethane resin consisting of polyurethane powder and fluoro resin powder. The coating layer is capable of preferably preventing the surface of the optical disc from being damaged. Because the flatness of the surface 1b of the lens holder 1 confronting the optical disc is excellent, the coating layer can be easily formed on the surface 1b of the lens holder 1.

The lens protector of the present invention for use in the optical pick-up will be described below with reference to FIG. 3. FIG. 3A is a perspective view of the lens protector, with a surface thereof confronting the optical disc facing upward, before a boss is cut off from the lens protector. FIG. 3B is a perspective view of the lens protector, with the surface thereof confronting the optical disc facing downward, before the boss is cut off from the lens protector. FIG. 3C is a perspective view of the lens protector mounted on the lens holder from which the boss shown in FIG. 3A has been cut off.

Figure 3:
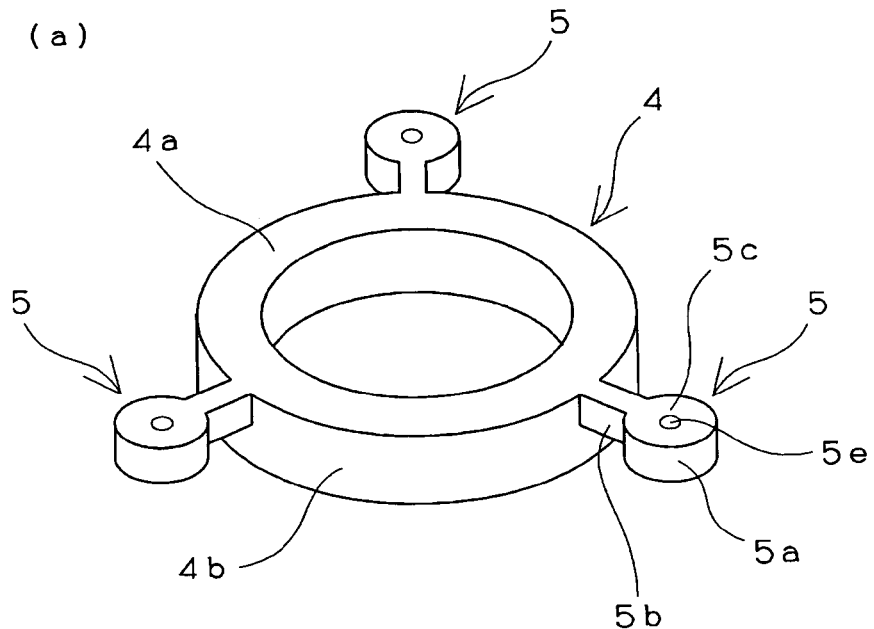
FIGS. 3(a)-(c) are perspective views of a lens protector according to one embodiment of the present invention.
Figure 3:
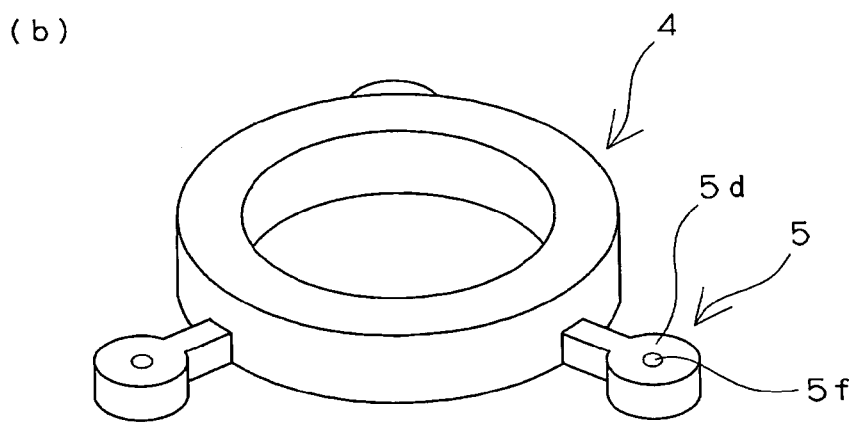
Figure 3:
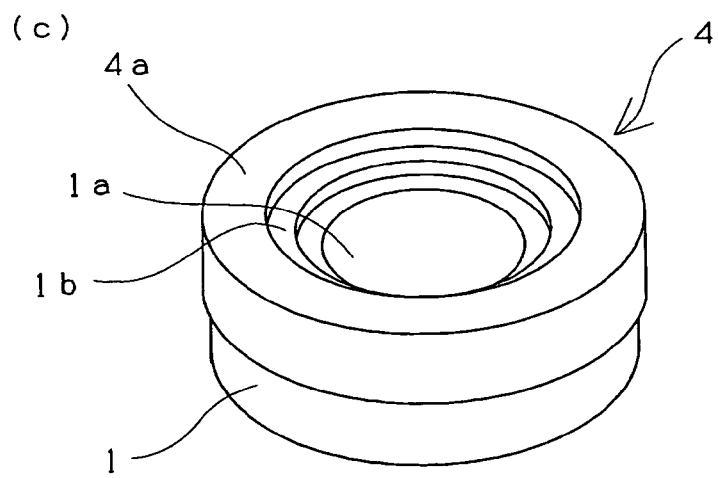

As shown in FIG. 3C, a lens protector 4 is mounted on the lens holder to prevent the objective lens from contacting the surface of the optical disc. The lens protector 4 is mounted on the surface 1b of the lens holder 1 confronting the optical disc, with the lens protector 4 surrounding the periphery of the objective lens. The lens protector 4 is configured in conformity to the configuration of the lens holder 1. Thus when the lens holder 1 is cylindrical, the lens protector 4 is annular, as shown in FIG. 3.

As shown in FIG. 3A, a plurality of bosses 5 is formed on the lens protector 4 in an injection-molding process. The bosses 5 are disposed on a peripheral side surface 4b of the lens protector 4. Each of the bosses 5 has a gate mark 5e formed on a surface 5c thereof confronting the optical disc and a contact portion 5f, contacting an ejector pin, which is formed on a rear surface 5d thereof, as shown in FIG. 3B. After the injection-molding process finishes, the bosses 5 are cut off from the lens protector 4. Thereby the lens protector 4 does not have the gate mark 5e or the contact portion 5f that contacts the ejector pin on a surface 4a thereof confronting the optical disc. Consequently no burrs are formed on the surface 4a of the lens protector 4. Therefore when the lens protector 4 contacts the optical disc, the surface of the optical disc is not damaged.

The number of the bosses 5 and the configuration thereof are similar to those of the boss 2 of the lens holder 1. The reference numerals 5a through 5f of FIG. 3 correspond to the reference numerals 3a through 3f of FIG. 2 respectively. Similarly to the lens holder 1, it is preferable to form a coating layer on the surface 4a of the lens protector 4 confronting the optical disc.

Resin compositions that can be used as the resin material for the lens holder and the lens protector of the present invention should be excellent in the mechanical strength and sliding property demanded therefor. It is preferable to use the following synthetic resins: nylon resin, polyamide-imide resin, polyphenylene sulfide resin (hereinafter referred to as PPS), polyacetal resin, polyether ether ketone resin, polyether ketone resin, polyether imide resin, polyether nitrile resin, fluoro resin, and liquid crystal polymer resin (hereinafter referred to as LCP). These synthetic resins can be used singly or in combination.

Of these resins, the PPS composition and the LCP composition are favorable because these resin compositions contain a fibrous filler and are capable of meeting a demand for the lens holder and the lens protector having a high elastic modulus respectively.

The LCP composition is particularly desirable because it has a high damping factor in addition to a high elastic modulus and has superior orientation inside the lens holder and the lens protector. It is possible to preferably use the following LCP compositions capable of forming an anisotropic melted phase: aromatic polyester (liquid crystal polyester), aromatic polyester imide (liquid crystal polyester imide), aromatic polyester amide (liquid crystal polyester amide), and polycarbonate (liquid crystal polycarbonate).

Both inorganic fibers and organic fibers can be used as the fibrous filler. For example, it is possible to use glass fiber, graphite fiber, carbon fiber, boron fiber consisting of boron evaporated on tungsten fiber or carbon fiber, silicone carbide fiber consisting of silicone carbide evaporated on tungsten fiber or carbon fiber, aromatic polyamide fiber, and various whiskers. It is possible to treat the surface of these fibers with an epoxy silane coupling agent or an amino silane coupling agent.

Figure 4:
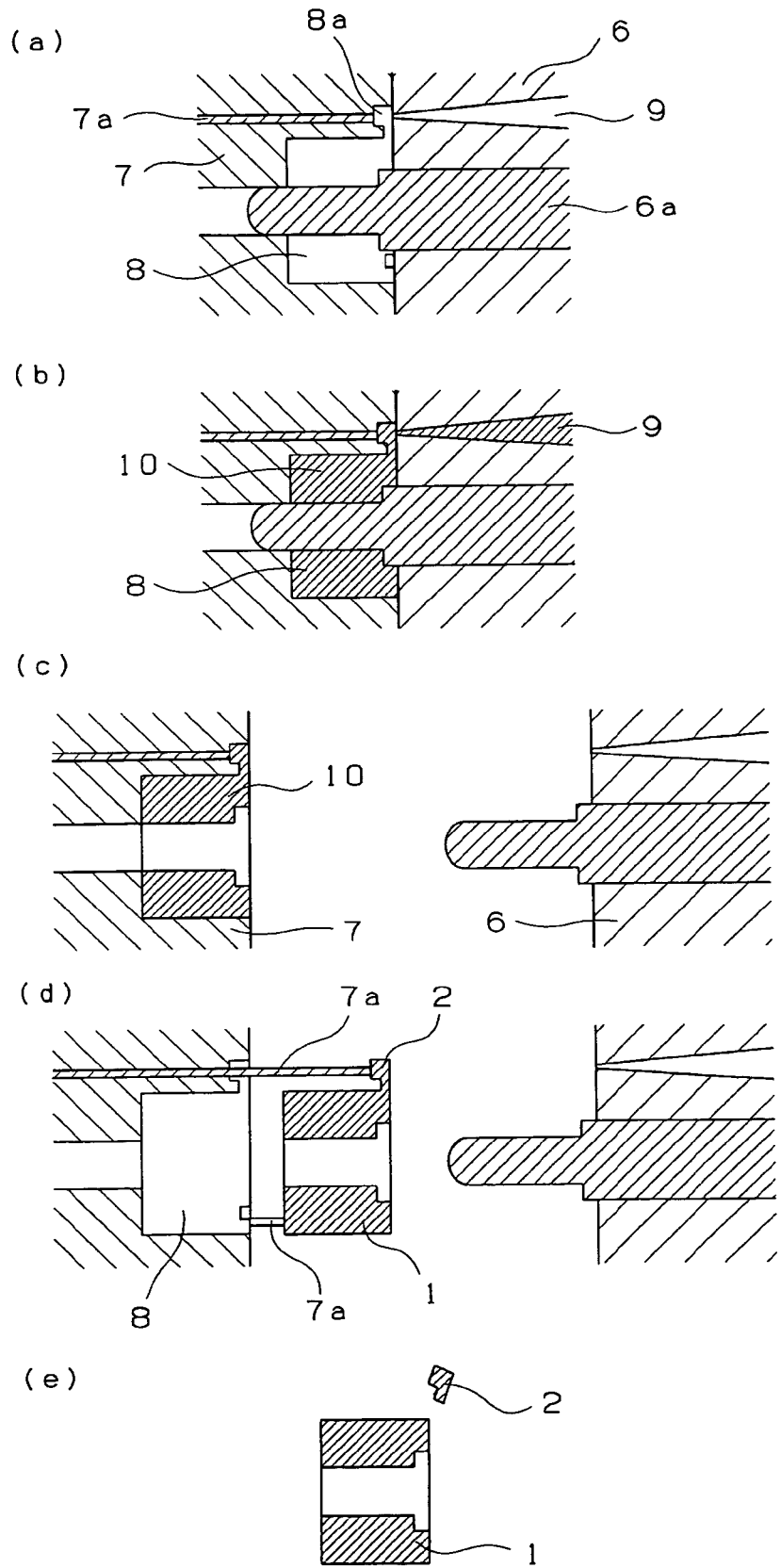
FIGS. 4(a)-(e) show a process of manufacturing a lens holder by an injection molding method of the present invention.

The method of producing the lens holder and the lens protector of the present invention for use in an optical pick-up is described below with reference to FIG. 4. FIGS. 4A through 4E show the process of producing the lens holder by injection molding. The method of producing the lens protector is the same as method of producing the lens holder except a cavity has the same configuration as a lens protector. Thus the method of producing the lens holder is described below.

(1) Die-closing process: A stationary-side template 6 and a movable-side template 7 are butted against each other to form a pin 6a for forming the lens-mounting hole 1a and a lens holder-shaped cavity 8. A boss portion 8a of the cavity 8 is formed as the boss 2 after an injection molding process finishes. A gate 9 communicates with the boss portion 8a (FIG. 4A).

(2) Resin-filling process: Melted resin 10 to be molded is filled into the cavity 8 by injection from the gate 9 provided at three positions (two positions are not shown in the drawing) (FIG. 4B).

(3) Die-opening process: After the resin 10 inside the cavity 8 cures through a follow-up pressure process and a cooling process, the movable-side template 7 is moved rearward, namely, in the left-hand direction in FIG. 4C to open the die (FIG. 4C).

(4) Molded product projection process: An ejector pin 7a in contact with the boss 2 is moved in the right-hand direction in FIG. 4D to project a molded product, namely, the lens holder 1 and the boss 2 from the cavity 8 (FIG. 4D).

Owing to sectional view of FIG. 4D, it is partially omitted that molded product projection process is performed by projecting simultaneously bosses 5 at three positions by means of three ejector pins 7a.

(5) Boss cut-off process: The boss 2 formed at three positions of the lens holder 1 is cut off (FIG. 4E). Thereafter the coating layer is formed on the surface of the lens holder 1.

In the injection-molding process of the method of producing the lens holder and the lens protector of the present invention, the gate and the contact portion that contacts the ejector pin are formed on the boss formed on the peripheral side surface of the lens holder and the lens protector. The boss is cut off from the lens holder and the lens protector in the boss cut-off process that is performed after the injection-molding process finishes. Therefore no burrs are formed on the surface of the lens holder and the lens protector which confronts the optical disc and may contact the surface of the optical disc. Consequently it is possible to prevent the surface of the optical disc from being damaged.

In the process of filling the melted resin into the cavity by injection, the melted resin is filled into the cavity from the gate of the boss formed on the peripheral side surface of the lens holder and the lens protector at three positions spaced at equal intervals. Thereby the flow distribution of the resin is uniform. Therefore when the LCP composition containing the fibrous filler is used, the fibrous filler can be distributed uniformly and hence the LCP composition can be utilized suitably.

The boss formed at the three positions are projected from the cavity at the same time by means of the ejector pins in the molded product projection process. Thereby the lens holder and the lens protector can be taken out of the cavity in a favorable balance.

EXAMPLES

A lens holder, of an optical pick-up, having the configuration shown in FIG. 2C was formed by injection-molding LCP (Bectra A230 containing 30 wt % of carbon fiber produced by Polyplastics Inc.).

Burrs were present on a cut mark of the boss and on parting lines formed on the lens holder from which bosses were removed. The surface of the lens holder confronting the optical disc had a flatness of 0.3 to 1.7 μm. It took 25 seconds to perform barrel polishing.

COMPARISON EXAMPLE

Figure 5:
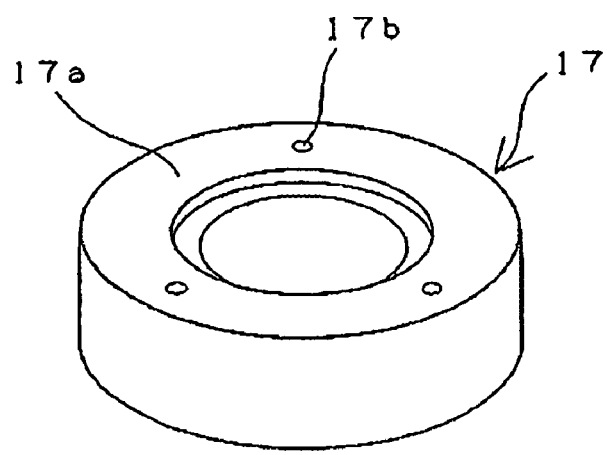
FIGS. 5(a)-(b) are perspective views of a lens holder manufactured by a conventional injection-molding method.
Figure 5:
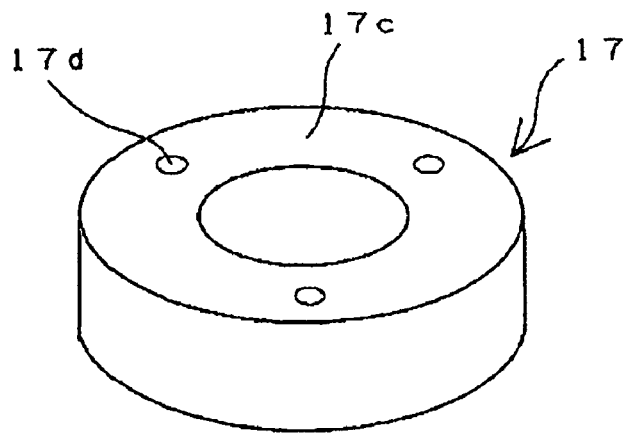

A lens holder of an optical pick-up having the configuration shown in FIG. 1 was formed by injection-molding the same resin as that used in the example by using a conventional injection-molding method. FIG. 5 shows a lens holder 17 obtained in the conventional injection-molding method. FIG. 5A is a perspective view of the lens holder, with a surface thereof confronting the optical disc facing upward. FIG. 5B is a perspective view of the lens holder, with the surface thereof confronting the optical disc facing downward.

As shown in FIG. 5A, a gate mark 17b remained on a surface 17a of the lens holder 17 confronting the optical disc. In addition, burrs were formed on the surface 17a of the lens holder 17 and the parting lines. The flatness of the surface 17a was 6 to 8 μm. As shown in FIG. 5B, a mark 17d of an ejector pin remained on a surface 17c of the lens holder 17 opposite to the surface 17a of the lens holder 17 confronting the optical disc. In addition, burrs were formed on the surface 17c of the lens holder 17 and the parting lines. It took 60 seconds to perform barrel polishing.

It has been found that burrs were formed less on the lens holder of the example than on the lens holder of the comparison example and that the flatness of the surface of the lens holder of the example is superior to that of the surface of the lens holder of the comparison example. The period of time required to perform the barrel polishing in the example was less than half the period of time required to perform the barrel polishing in the comparison example. Further because fine media can be used in the example, it is possible to prevent media from clogging in the lens-mounting hole or other portions.

The lens holder of the present invention can be suitably utilized to hold the objective lens for use in the optical pick-up used to read and record information of the optical information-recording media such as a DVD-ROM, a DVD-RW, and the like whose capacity has increased in recent years. The lens protector of the present invention can be suitably utilized to protect the lens holder.

What is claimed is:

1. A lens holder intermediate product for an optical pick-up formed by injection-molding, made of a polyphenylene sulfide resin composition or a liquid crystal polymer resin composition of comprising a lens mounting hole capable of holding an objective lens on a surface of said lens holder intermediate product confronting an optical disc, wherein
    a boss is formed on a peripheral side surface of said lens holder intermediate product;
    said boss has a gate mark of a pin point gate formed on a surface of said boss confronting said optical disc and a contact portion which contacts an ejector pin formed on a rear surface of said boss.

2. A lens holder intermediate product according to claim 1, wherein said boss is formed at three positions spaced at equal intervals on said peripheral side surface.

* * * * *